(12) United States Patent
Ruprecht

(10) Patent No.: US 8,741,137 B2
(45) Date of Patent: Jun. 3, 2014

(54) FILTERING METHODS AND CONFIGURATIONS

(75) Inventor: John C. Ruprecht, North Oaks, MN (US)

(73) Assignee: Clean & Clear Corporation, White Bear Lake, MN (US)

( * ) Notice: Subject to any disclaimer, the term of this patent is extended or adjusted under 35 U.S.C. 154(b) by 768 days.

(21) Appl. No.: 12/722,869

(22) Filed: Mar. 12, 2010

(65) Prior Publication Data
US 2011/0220592 A1    Sep. 15, 2011

(51) Int. Cl.
*B01D 24/10*    (2006.01)

(52) U.S. Cl.
USPC ........... 210/232; 210/282; 210/283; 210/287; 210/289; 210/443; 210/455; 210/902

(58) Field of Classification Search
None
See application file for complete search history.

(56) References Cited

U.S. PATENT DOCUMENTS

| | | | | |
|---|---|---|---|---|
| 647,580 | A * | 4/1900 | Parker | 210/467 |
| 690,457 | A * | 1/1902 | Parker | 210/244 |
| 2,731,153 | A * | 1/1956 | Kennedy | 210/434 |
| 2,795,333 | A * | 6/1957 | Kennedy | 210/223 |
| 2,926,787 | A * | 3/1960 | Combest | 210/223 |
| 3,080,977 | A * | 3/1963 | Jones | 210/232 |
| 3,335,917 | A * | 8/1967 | Knight | 222/189.07 |
| 4,064,049 | A * | 12/1977 | Calvano | 210/247 |
| 5,064,534 | A | 11/1991 | Busch et al. | |
| 5,128,036 | A * | 7/1992 | Svensson | 210/264 |
| 5,230,812 | A * | 7/1993 | Williams | 210/767 |
| 5,269,919 | A | 12/1993 | von Medlin | |
| 5,342,528 | A | 8/1994 | Adachi et al. | |
| 5,380,432 | A * | 1/1995 | Brandt | 210/243 |
| 5,382,359 | A * | 1/1995 | Brandt | 210/243 |
| 5,609,759 | A * | 3/1997 | Nohren et al. | 210/266 |
| 5,700,371 | A * | 12/1997 | Koslow | 210/232 |
| 5,911,879 | A * | 6/1999 | Eybergen | 210/282 |
| 5,914,037 | A * | 6/1999 | Yen | 210/234 |
| 5,914,045 | A * | 6/1999 | Palmer et al. | 210/694 |
| 5,919,365 | A * | 7/1999 | Collette | 210/419 |
| 5,928,512 | A * | 7/1999 | Hatch et al. | 210/266 |
| 6,004,460 | A * | 12/1999 | Palmer et al. | 210/232 |
| 6,068,770 | A * | 5/2000 | Niermeyer et al. | 210/321.6 |
| 6,136,189 | A * | 10/2000 | Smith et al. | 210/266 |
| 6,153,096 | A * | 11/2000 | Nonren, Jr. | 210/238 |
| 6,165,362 | A * | 12/2000 | Nohren et al. | 210/266 |
| 6,193,886 | B1 * | 2/2001 | Nohren, Jr. | 210/282 |
| 6,221,416 | B1 * | 4/2001 | Nohren, Jr. | 426/394 |
| RE37,216 | E * | 6/2001 | Koslow | 210/232 |

(Continued)

OTHER PUBLICATIONS

Water Filtration? The Choice is Clear . . . Clean+Clear WaterSolver with BioBlocker, brochure, 2 pages, Clean & Clear Corporation, White Bear Lake, MN (info@gocleanandclear.com).

(Continued)

*Primary Examiner* — Robert James Popovics
(74) *Attorney, Agent, or Firm* — Fredrikson & Byron, P.A.

(57) ABSTRACT

Passing a fluid though a single filter module effectively removes at least two different types of impurities from the fluid. The fluid is directed through at least two different types of filtering media within the single module. The at least two different types of filtering media are separated from one another, within the single module, by a porous containment layer of the module; and, one of the at least two different type of filtering media forms a core of the module, which is surrounded by the porous containment layer.

9 Claims, 4 Drawing Sheets

(56) References Cited

U.S. PATENT DOCUMENTS

| | | | |
|---|---|---|---|
| 6,395,170 B1 * | 5/2002 | Hughes et al. | 210/232 |
| 6,500,335 B2 * | 12/2002 | Janik et al. | 210/232 |
| 6,524,477 B1 | 2/2003 | Hughes | |
| 6,569,329 B1 | 5/2003 | Nohren, Jr. | |
| 6,579,455 B1 * | 6/2003 | Muzik et al. | 210/234 |
| 6,635,175 B2 * | 10/2003 | Stankowski | 210/232 |
| 7,186,338 B2 * | 3/2007 | Boisvert | 210/232 |
| 7,387,725 B2 * | 6/2008 | Choi et al. | 210/232 |
| 7,427,355 B2 * | 9/2008 | Chau | 210/266 |
| 7,441,664 B2 * | 10/2008 | Tanner et al. | 210/436 |
| 7,695,618 B2 * | 4/2010 | Mules | 210/232 |
| 7,708,879 B2 * | 5/2010 | Girondi | 210/86 |
| 7,862,720 B2 * | 1/2011 | Brown | 210/335 |
| 7,906,022 B2 * | 3/2011 | Matsushita et al. | 210/232 |
| 7,918,204 B2 * | 4/2011 | Gignac et al. | 123/195 A |
| 8,029,672 B2 * | 10/2011 | Baumann et al. | 210/340 |
| 8,167,141 B2 * | 5/2012 | Knipmeyer et al. | 210/464 |
| 2002/0043491 A1 * | 4/2002 | Janik et al. | 210/249 |
| 2004/0222145 A1 * | 11/2004 | Onoue et al. | 210/435 |
| 2007/0090043 A1 * | 4/2007 | Matsushita et al. | 210/443 |
| 2007/0221560 A1 * | 9/2007 | Girondi | 210/232 |
| 2007/0295667 A1 | 12/2007 | Ruprecht | |
| 2011/0220592 A1 * | 9/2011 | Ruprecht | 210/806 |

OTHER PUBLICATIONS

What is BioBlocker?, brochure, 2 pages, Clean & Clear Corporation, White Bear Lake, MN (info@gocleanandclear.com).

Clean+Clear and Arsenic Removal, brochure, 2 pages, Clean & Clear Corporation, White Bear Lake, MN (info@gocleanandclear.com).

Doulton Water Filter Ceramic Candle & Cartridge Technologies, taking the mysteries out of the drinking water filtration, Article, Doulton USA, Oct. 13, 200, 6 pages (pulled from website: http://www.doutonusa.com/HTML%20pages/technology.htm).

* cited by examiner

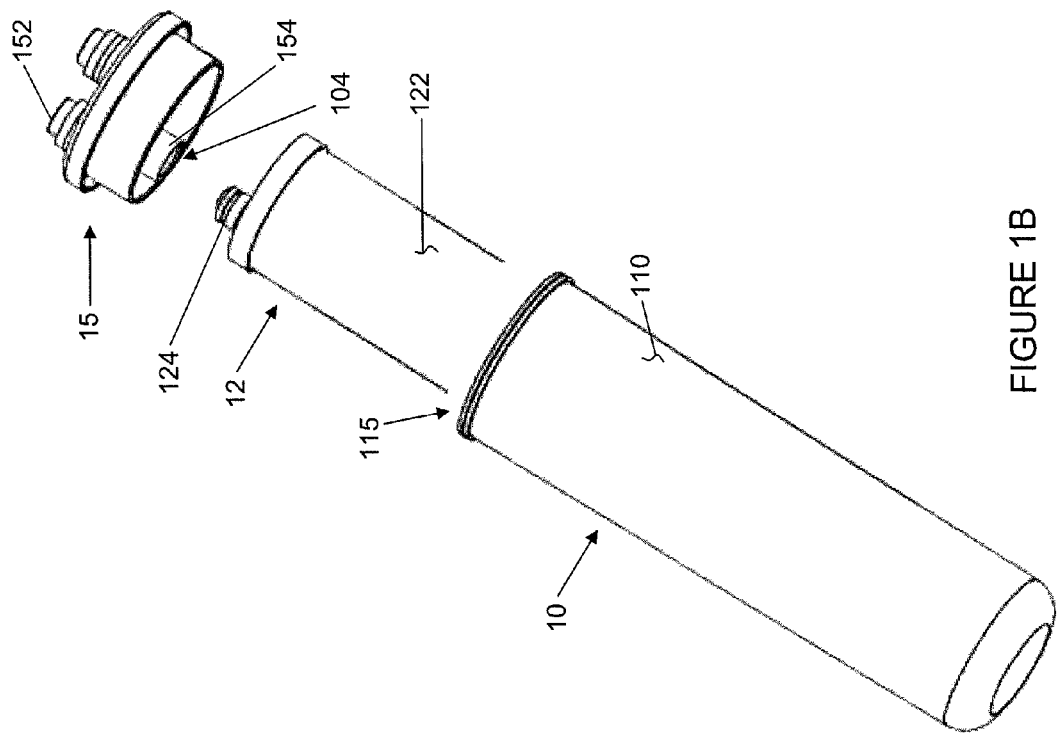
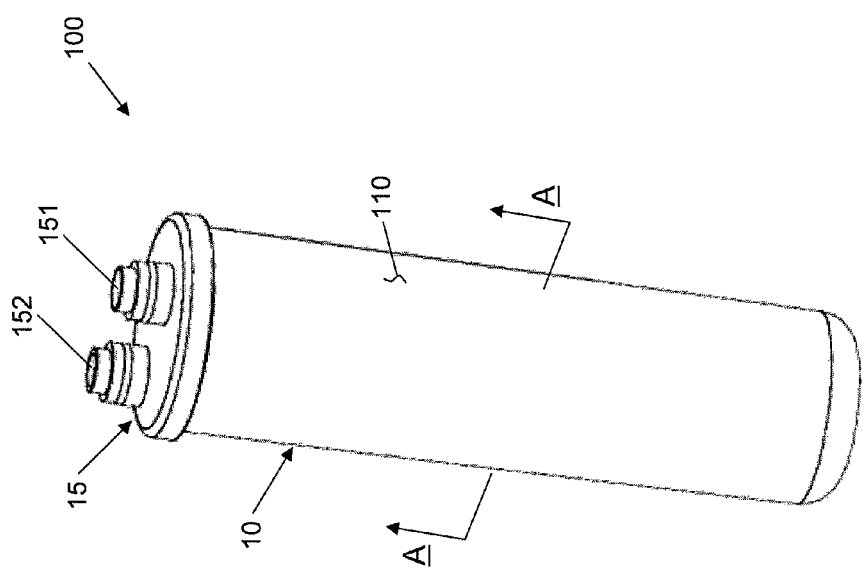
FIGURE 1A
FIGURE 1B

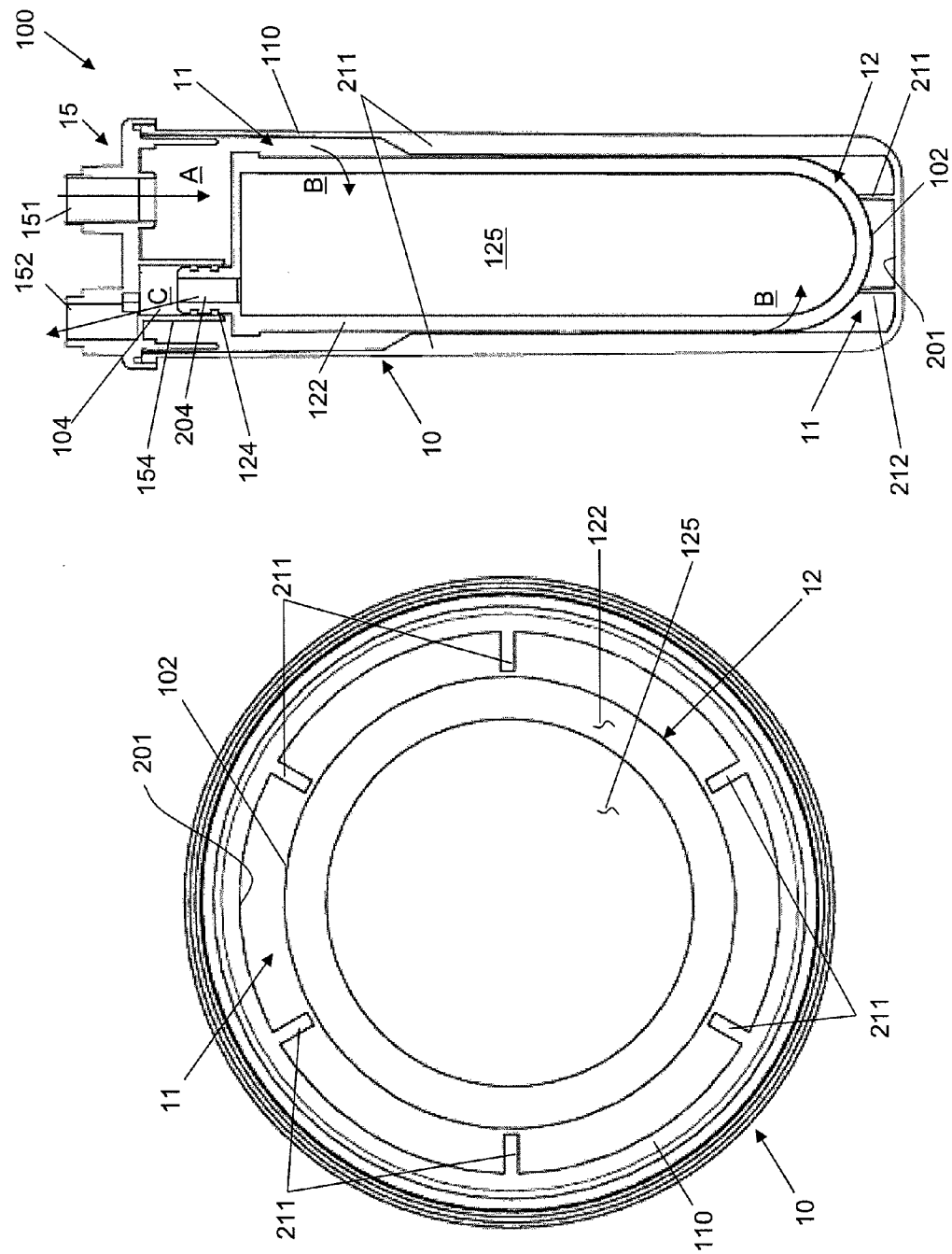

FILTERING METHODS AND CONFIGURATIONS

TECHNICAL FIELD

The present invention pertains to filtering, and more particularly to methods and configurations that effectively remove multiple impurities from a fluid such as water.

BACKGROUND

Fluid filtering systems and methods, for example, employing granular activated carbon (GAC) are known in the art. For example, Clean & Clear Corporation of White Bear Lake, Minn. sells the WaterSaver™ with BioBlocker™ system, which employs a combination of ceramic filtration and GAC filtration. A filter module of the WaterSaver™ with BioBlocker™ system includes a filter element core, which is formed by GAC and surrounded by a porous ceramic shell; the ceramic sidewall has approximately 0.05% silver embedded therein, for example, to act as a self sterilizing agent that inhibits microbe and bacteria growth. Commonly-assigned and co-pending United States patent application US 2007/0295667 also describes various configurations of filter modules that can employ GAC in combination with such a ceramic shell.

GAC is typically employed in drinking water filter systems to remove impurities, for example, chlorine and its by-products, as well as other volatile organic compounds (carbon based VOC's). Various types of GAC, as well as other types of filtering media, are available to address alternative filtering needs. Thus, there is a need for new configurations of filter modules that can readily take advantage of the various types of filtering media that are available.

BRIEF DESCRIPTION OF THE DRAWINGS

The following drawings are illustrative of particular exemplary embodiments and therefore do not limit the scope of the invention. The drawings are not to scale (unless so stated) and are intended for use in conjunction with the explanations in the following detailed description. Disclosed embodiments will hereinafter be described in conjunction with the appended drawings, wherein like numerals denote like elements.

FIG. 1A is a perspective view of a filter module which may be configured according to some embodiments of the present invention.

FIG. 1B is an exploded perspective view of the filter module shown in FIG. 1A.

FIG. 2A is a radial section view, through line A-A of FIG. 1A, of the filter module, according to some embodiments of the present invention.

FIG. 2B is a longitudinal section view of the filter module shown in FIG. 1A, according to some embodiments of the present invention.

DETAILED DESCRIPTION

Figure 4:
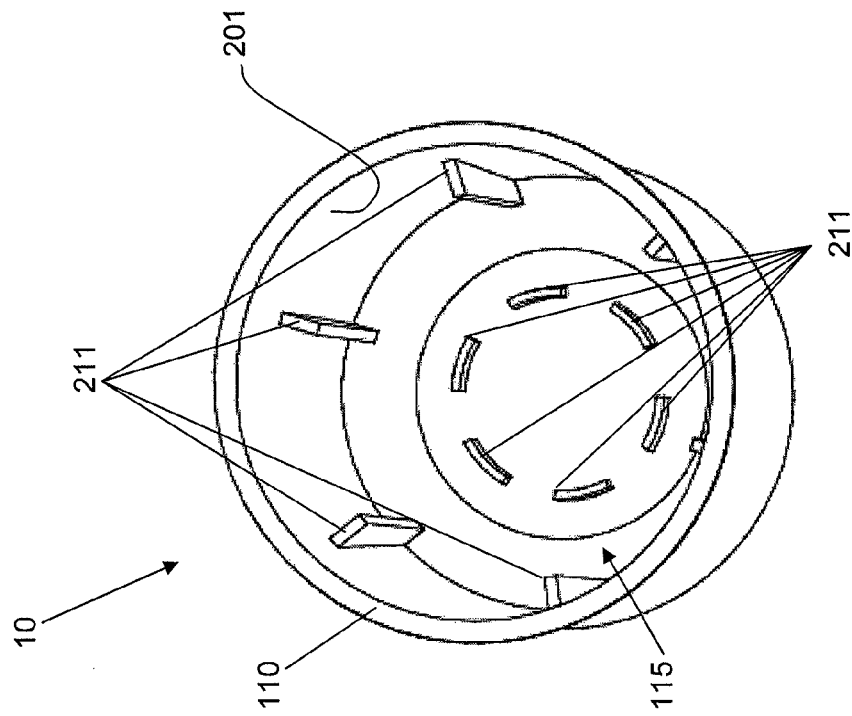
FIG. 4 is a perspective view of a cap for a filter module housing, according to some embodiments.

The following detailed description is exemplary in nature and is not intended to limit the scope, applicability, or configuration of the invention in any way. Rather, the following description provides practical illustrations for practicing exemplary methods and implementing exemplary embodiments of the present invention. Those skilled in the art will recognize that many of the examples provided have suitable alternatives that can be utilized.

Embodiments of the present invention employ a relatively compact and modular configuration to carry out multiple filtering tasks in a single unit, wherein each filtering task effectively removes a different type of impurity from a fluid such as water. The general configuration of filter modules of the present invention, for example, according to exemplary embodiments disclosed herein, can provide fluid filtering in which various types of impurities are effectively removed, without imposing a significant pressure drop, so that a required volume flow rate can be maintained through the modules. The configuration of the modules further segregates multiple filtering media in a manner that prevents mixing and release of the filtering media with the flow of fluid through the module, and that prevents channels from being formed by the fluid flow through the media. It should be noted that the term "filtering media" is used herein to denote a relatively loose collection of particles or granules that effectively remove impurities by adsorption thereof or by a converting reaction therewith.

FIG. 1A is a perspective view of a filter module 100, which may be configured according to some embodiments of the present invention. FIG. 1 illustrates filter module 100 including a housing 10 and a cap 15. Housing 10 is shown including a sidewall 110, and cap 15 is shown including a first port 151 and a second port 152. First port 151 is preferably configured for connection to a fluid source, so as to form an inlet for the flow of fluid into module 100, while second port 152 forms an outlet for the filtered fluid.

According to the illustrated embodiment, a filter element 12 is contained within housing sidewall 110, and cap 15 is secured to housing sidewall 110, in order to cover a single opening 115 of housing sidewall 110; opening 115 and filter element 12 may be seen in FIG. 1B. FIG. 1B is an exploded perspective view of filter module 100, wherein cap 15 is shown separated from housing 10 and a filter element 12 is shown pulled out from within housing sidewall 110 through opening 115. In FIG. 1B a sidewall 154 of second port 152 may be seen extending inward to form a channel 104 for coupling to a connector 124 of filter element 12.

FIG. 2A is a radial section view, through line A-A of FIG. 1A, and FIG. 2B a longitudinal section view of filter module 100, through ports 151, 152, according to some embodiments of the present invention. FIGS. 2A-B illustrate filter element 12 including a filtering core 125 surrounded by a porous containment layer 122. According to some embodiments, layer 122 is formed by a porous ceramic casting, for example, having a thickness of approximately 0.25 inch, that blocks and kills bacteria, for example, by including a self-sanitizing agent, such as approximately 0.05% silver, embedded therein, and by having a porosity that provides up to 99.99% filtering efficiency at approximately 0.7 microns. According to alternate embodiments, layer 122 may be formed by a porous paper or polymer material, or a combination thereof, for example, that provides ten micron filtration. It should be noted that alternative configurations of filter elements may be substituted in place of filter element 12, according to additional embodiments of the present invention, for example as will be described below, in conjunction with FIG. 5.

FIGS. 2A-B further illustrate filter module 100 including another filter element 11, which surrounds filter element 12, within housing sidewall 110. According to the illustrated embodiment, inner surface 201 of housing sidewall 110 extends about an entire perimeter of filter element 12, such that a space, in which filter element 11 is contained, extends between inner surface 201 of housing sidewall 110 and an outer surface 102 of filter element 12. According to preferred embodiments of the present invention, filtering core 125 is formed from one type of filtering media to effectively remove one type of impurity from a fluid, and filter element 11 is formed from another type of filtering media, to effectively remove another, different type of impurity from the fluid. For example, if core 125 is formed by a granular activated carbon (GAO) that adsorbs chlorine and its by-products, filter element 11 may be formed by a Granular Ferric Hydroxide (GFH), such as, an NSF® Standard 61-approved ferric-based, nonregenerative media that adsorbs arsenic, selenium, phosphate, chromium and other heavy metals, or filter element 11 may be formed by another type of GAO that is enriched, for example, being impregnated, according to methods known in the art, with a metal oxide, such as iron-oxide or titanium-oxide, in order to effectively remove arsenic. Alternately, if core 125 is formed by a filtering media that effectively removes arsenic etc., then filter element 11 may be formed by GAO that effectively removes chlorine etc. According to yet further alternate embodiments, a filtering media that effectively removes iron from the fluid may form one of core 125 and filter element 11, so that the other of core 125 and element 11 is formed by a filtering media that effectively removes chlorine etc., or a filtering media that effectively removes arsenic etc. The filtering media of element 11 fills either a majority of the space or an entirety of the space between inner surface 201 of housing sidewall 110 and an outer surface 102 of filter element 12.

Figure 3:
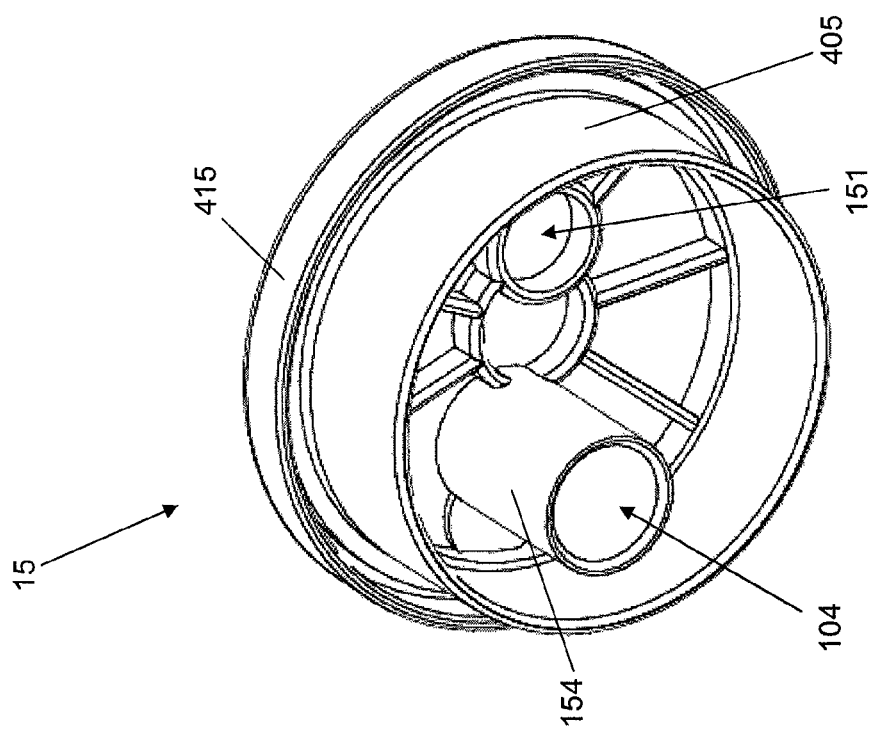
FIG. 3 is a perspective view of a filter module housing, according to some embodiments of the present invention.

FIG. 2B further illustrates sidewall 154 of second port 152 coupled to connector 124 of filter element 12; and connector 124 is shown forming a conduit 204 that is in fluid communication with filtering core 125, so that channel 104 of sidewall 154 provides fluid communication between second port 152 and core 125. FIG. 2B further illustrates first port 151 of cap 15 in fluid communication with filter element 11. FIG. 3 is a perspective view of cap 15 wherein a lip 415 of cap 15 is shown surrounding a perimeter sidewall 405 of cap 15, which surrounds channel 104 and an inner opening of first port 151. With reference back to FIGS. 1B and 2B, it may be appreciated that perimeter sidewall 405 of cap 15 fits within opening 115 of housing 10 such that a perimeter edge 150 of opening 115 interlocks with cap 15 in between sidewall 405 and lip 415, when cap 15 is secured over opening 115. According to some embodiments, this interlocking fit secures cap 15, while, according to other embodiments, a bond joint may be formed, for example, with an adhesive or via welding, between cap 15 and perimeter edge 150 in order to secure cap 15.

According to some methods of the present invention, the filtering media of filter element 11 may be dispensed into the space either through opening 115 of housing 10, prior to securing cap 15 to housing sidewall 110, or through port 151, after securing cap 15 to housing sidewall 110. In either case, filter element 12 is preferably positioned within housing 10, for example, via insertion through opening 115, prior to filling the space with the media that forms filter element 11. If the media is dispensed through port 151, cap 15 may be joined to filter element 12, via the connection between sidewall 154 and connector 124, either before or after filter element 12 is positioned within housing 10. According to some preferred embodiments, filter element 11 is formed by approximately the same amount of filtering media that forms filtering core 125, for example, approximately 15 ounces in the case of a ten inch long filter element 12.

With further reference to FIGS. 2A-B, in conjunction with FIG. 4 (a perspective view of housing 10, looking in through opening 115), housing sidewall 110 preferably includes a plurality of inward projecting ridges 211 that are positioned to hold filter element 12 in spaced relation with inner surface 201 of housing sidewall 110. Ridges 211 may help to maintain the position of filter element 12 within housing 10 so that a geometry of the space that contains the filtering media of filter element 11 is relatively stable. Although the illustrated plurality of inward projecting ridges 211 are preferred, alternate embodiments of the present invention include fewer or more numerous numbers of ridges 211 that may be arranged in other suitable configurations, or even include other types of one or more housing sidewall projections that function to hold filter element 12 in spaced relation with inner surface 201 of housing sidewall 110, thereby establishing a relatively stable space for the filtering media of filter element 11 to occupy.

Filter module 100 may be configured in various lengths according to the desired volume flow of fluid therethrough. According to some exemplary embodiments, wherein containment layer 122 is formed by the above-described porous ceramic, regardless of the length of filter module 100, an outer diameter of filter element 12 is approximately 2.6 inches and an inner diameter of housing sidewall 110 is approximately 3.2 inches, such that ridges 211 project approximately 0.3 inch into the space between filter element 12 and sidewall 110. With further reference to FIG. 2B, it may be appreciated that a length of housing sidewall 110 exceeds that of filter element 12, and a length of filter element 12 exceeds that over which ridges 211 extend. According to some exemplary embodiments, if filter element 12 is approximately five inches long, housing sidewall 110 is approximately 6.5 inches long, and ridges 112 extend over a length of approximately three inches; if filter element 12 is approximately ten inches long, housing sidewall is approximately 11.5 inches long, and ridges 112 extend over a length of approximately eight inches; and, if filter element 12 is approximately sixteen inches long, housing sidewall 110 is approximately 17.5 inches long, and ridges 112 extend over a length of approximately fourteen inches.

With reference back to FIG. 1A, in conjunction with FIG. 2B, according to some preferred methods of the present invention, first port 151 is connected to a fluid supply so that the fluid is initially directed through filter element 11, per arrow A, and is then drawn, first, through porous containment layer 122 and then through core 125 of filter element 12, per arrow B, before exiting via second port 152, per arrow C. The "outside-in" direction of flow through module 100 can extend the life of the module 100 by preventing channeling through the filtering media thereof. As previously described, filter element 11 is formed by a first type of filtering media, which is tailored to effectively remove one type of impurity from the fluid flowing therethrough, and core 125 of filter element 12 is formed by a second type of filtering media, which is tailored to effectively remove another type of impurity from the fluid that flows therethrough. Another type of impurity, in addition to chlorine etc. and arsenic etc., that may be effectively removed from fluid passing through module 100 may be iron; examples of filtering media that effectively remove iron from water include, without limitation, manganese greensand and a high-purity copper-zinc formulation known as KDF (Kinetic Degradation Fluxion).

Figure 5:
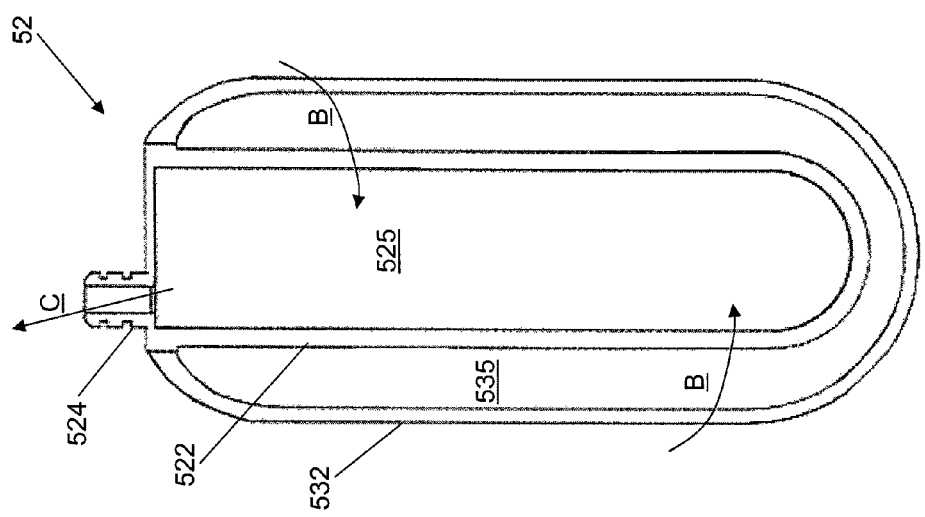
FIG. 5 is a longitudinal section view of a portion of a filter module, according to some alternative embodiments.

FIG. 5 is a longitudinal section view of a filter element 52, which may be substituted in place of filter element 12 in filter module 100, according to some alternative embodiments. FIG. 5 illustrates filter element 52 including a conduit formed by a connector 524, a filtering core 525, in fluid communication with the conduit, an inner porous containment layer 522 and an outer porous containment layer 532, which encloses a space 535 that surrounds both core 525 and inner layer 522. According to the illustrated embodiment, space 535 contains one type of filtering media and core 525 is formed by another type of filtering media. Outer porous containment layer 532 may be formed by a porous ceramic casting, or a porous paper and/or polymer material, for example, that provides 10 micron filtration; likewise, inner porous containment layer 522 may be formed by the above-described porous ceramic casting or by another porous paper and/or polymer material that provides filtration of smaller particles, for example, down to 0.7 microns.

With reference back to FIG. 2B it may be appreciated that, when element 52 is substituted for element 12, within sidewall 110 of housing 10, sidewall 154 of second port 152 of cap 15 is coupled to connector 524 of filter element 52 so that channel 104 provides fluid communication between second port 152 and core 525 for flow out from filter module 100, per arrow C. Furthermore, filter element 11, which is formed by a filtering media of a different type from that which fills space 535, and from that which forms core 525, surrounds filter element 52 within sidewall 110 and is in fluid communication with first port 151. Thus, the fluid that flows through filter module 100, when module 100 incorporates filter element 52 in place of filter element 12, has at least one more type of impurity effectively removed therefrom by the filtering media that is contained in space 535. According to an exemplary embodiment, the filtering media that forms filter element 11 may be selected from a group that includes media for effectively removing arsenic, media for effectively removing chlorine and media for effectively removing iron, so that the filtering media that fills space 535 is of another of the aforementioned types of media, and the filtering media that forms core 525 is of the remaining type of media. With reference, again, to FIGS. 2B and 4, it may be appreciated that, when filter element 52 is substituted for element 12, the fluid that flows from a source and into module 100, per arrow A, encounters the filtering media of filter element 11 before passing through, per arrow B, outer porous containment layer 532, the filtering media contained in space 535, inner porous containment layer 522 and core 525.

In the foregoing detailed description, the invention has been described with reference to specific embodiments. However, it may be appreciated that various modifications and changes can be made without departing from the scope of the invention as set forth in the appended claims.

The invention claimed is:

1. A filter module comprising:
   a housing including at least one sidewall and defining a housing volume and a single end opening;
   a cap sealingly secured to said filter housing over said single end opening, the cap including a first port for introducing a fluid to be filtered into said housing and a second port for allowing filtered fluid to exit said filter housing;
   a first filtering media being contained within the housing volume; and
   a filter element including:
   a porous containment layer; and
   a filtering core, the filtering core being formed by a second filtering media that is enclosed within the porous containment layer, the filter element being surrounded by the first filtering media and being contained within the housing volume so that the second filtering media is in fluid communication with the second port of the cap;
   wherein fluid entering said housing through said first port passes sequentially through said first filtering media, then through said porous containment layer, then through said second filtering media, with said first filtering media effectively removing at least a first impurity from a fluid received by the first port, and the second filtering media effectively removes at least a second, different impurity from the fluid.

2. The filter module of claim 1, wherein the first filtering media fills a first space between an outer surface of the filter element and an inner surface of the housing sidewall.

3. The filter module of claim 2, wherein the housing further includes at least one projection extending from the inner surface of the housing sidewall into the first space between said inner surface of the housing sidewall and the outer surface of the filter element.

4. The filter module of claim 1, wherein:
   the filter element further includes a connector that forms a conduit placing fluid which has passed through the second filter media in fluid communication with the second port of the cap; and
   the second port of the cap includes a sidewall forming a channel, the sidewall of the second port projecting into the housing and being coupled to the connector of the second filter element.

5. The filter module of claim 1, wherein:
   the first impurity comprises one of a group that includes chlorine, arsenic and iron; and
   the second impurity comprises another of said group.

6. The filter module of claim 1, wherein:
   the porous containment layer comprises a first porous containment layer; and wherein
   the filter element includes a second porous containment layer and a third filtering media, the third filtering media being enclosed in a space between the porous containment layer that encloses the core and the second porous containment layer; and
   the third filtering medial effectively removes a third impurity from the fluid, the third impurity being different from the first and second impurities.

7. The filter module of claim 6, wherein:
   the first impurity comprises one of a group that includes chlorine, arsenic and iron;
   the second impurity comprises another of the group; and
   the third impurity comprises yet another of the group.

8. The filter module of claim 1, wherein the housing is substantially cylindrical.

9. The filter module of claim 8, wherein the first space comprises an annular space.

* * * * *

UNITED STATES PATENT AND TRADEMARK OFFICE
CERTIFICATE OF CORRECTION

| | | |
|---|---|---|
| PATENT NO. | : 8,741,137 B2 | Page 1 of 1 |
| APPLICATION NO. | : 12/722869 | |
| DATED | : June 3, 2014 | |
| INVENTOR(S) | : John C. Ruprecht | |

It is certified that error appears in the above-identified patent and that said Letters Patent is hereby corrected as shown below:

TITLE PAGE: ITEM 73

"Clean & Clear Corporation, White Bear Lake, MN (US)" should read --"Clean & Clear Corporation, St. Paul, MN (US)--

Signed and Sealed this
Seventeenth Day of February, 2015

Michelle K. Lee
*Deputy Director of the United States Patent and Trademark Office*